United States Patent

Lober et al.

[11] Patent Number: 6,131,031
[45] Date of Patent: Oct. 10, 2000

[54] SYSTEM AND METHOD FOR AN UNDERLAY CELLULAR SYSTEM

[75] Inventors: Richard M. Lober, Gaithersburg; Ali Fouladi Semnani, Baltimore; Marc Elgaway, Darnestown, all of Md.

[73] Assignee: Watkins-Johnson Company, Palo Alto, Calif.

[21] Appl. No.: 08/948,771

[22] Filed: Oct. 10, 1997

[51] Int. Cl.[7] .................................................. H04Q 7/20
[52] U.S. Cl. .......................... 455/444; 455/443; 455/447; 455/453
[58] Field of Search ..................... 455/450, 455, 455/509, 516, 443, 444, 447, 448, 452, 426, 62, 453

[56] References Cited

U.S. PATENT DOCUMENTS

| | | | |
|---|---|---|---|
| 4,528,656 | 7/1985 | Morais | 370/281 |
| 4,790,000 | 12/1988 | Kinoshita | 455/449 |
| 4,881,271 | 11/1989 | Yamauchi et al. | 455/436 |
| 4,935,924 | 6/1990 | Baxter | 370/487 |
| 5,040,238 | 8/1991 | Comroe et al. | 455/520 |
| 5,067,147 | 11/1991 | Lee | 455/436 |
| 5,193,101 | 3/1993 | McDonald et al. | 375/200 |
| 5,212,805 | 5/1993 | Comroe et al. | 455/520 |
| 5,280,630 | 1/1994 | Wang | 455/56.1 |
| 5,357,559 | 10/1994 | Kallin et al. | 379/59 |
| 5,402,523 | 3/1995 | Berg | 455/450 |
| 5,437,054 | 7/1995 | Rappaport et al. | 455/33.1 |
| 5,454,024 | 9/1995 | Lebowitz | 379/40 |
| 5,483,666 | 1/1996 | Yamada et al. | 455/454 |
| 5,487,101 | 1/1996 | Fletcher | 379/60 |
| 5,499,386 | 3/1996 | Karlsson | 455/33.2 |
| 5,561,839 | 10/1996 | Osterberg et al. | 455/446 |
| 5,710,973 | 1/1998 | Yamada et al. | 455/434 |
| 5,911,123 | 6/1999 | Shaffer et al. | 455/554 |

*Primary Examiner*—Dwayne D. Bost
*Assistant Examiner*—Sonny Trinh
*Attorney, Agent, or Firm*—Flehr Hohbach Test Albritton & Herbert LLP

[57] ABSTRACT

An underlay cellular telephone system disposed within a main cellular telephone system is provided. Specifically, the invention includes a system and method suitable to provide an independent cellular system which operates as an underlay system to an existing main cellular system and provides public or private cellular service without the need for system returning or frequency coordination with the main cellular system. The main cellular system includes a plurality of contiguous cells, each of said cells having a fixed set of frequencies (or "channels") and a main controller (also referred to as a "switch" or "MSC") operatively coupled to said cells for coordination and control of communication within the main cellular system. The underlay cellular system operates to determine which of the fixed set of frequencies are under-utilized and establishes communication over any number of the under-utilized frequencies without coordination and control by the main controller. The underlay cellular system monitors the continued availability of the under-utilized frequencies by detecting certain interference conditions, and updates the under-utilized frequencies.

27 Claims, 6 Drawing Sheets

SYSTEM AND METHOD FOR AN UNDERLAY CELLULAR SYSTEM

FIELD OF THE INVENTION

The present invention relates generally to cellular telephone communications systems. More particularly, the invention relates to an underlay cellular system that provides service within a main cellular system without coordination or control by the main system.

BACKGROUND OF THE INVENTION

Cellular communication systems are generally based upon the creation of specific, geographically defined, separated "cells" or "cell sites." Each cellular system is allocated a specific set of licensed frequencies (or channels) with which to operate. In a typical system, licensed voice channels are divided among seven cells, thereby providing a plurality of channels for use in each cell. This deployment is often referred to as a frequency reuse factor of seven. This seven cell cluster is then replicated, allowing for reuse of the spectrum, as needed to provide coverage of a communication area. In areas where high user volume is experienced, certain cells may be divided to form geographically smaller cells, or clusters, thereby increasing the overall number of channels available for communication.

Typically located within each cell is a base station containing control and transmission equipment. The base station generally includes at least one antenna network, associated transmit and receive apparatus and control apparatus. The base station is coupled via communication links to a mobile switch center (MSC), also often referred to as a mobile telephone switching office (MTSO), hereinafter the term MSC is used. The MSC is coupled to the local telephone switching office, referred to as the Public Switching Telephone Network (PSTN), with interfaces to standard wire line telephones. Typically, the MSC controls the operation of the cellular communication system by routing and processing the incoming and outgoing calls, and switching the calls between cell sites.

Each cell site is assigned two particular control channels, a forward control channel (FCC) and reverse control channel (RCC). The remaining channels are usually used for communications, and are called voice channels including forward voice channels (FVC) and reverse voice channels (RVC). The control channels provide commands to the mobile units for cellular control. Control transmission made from the cell site to the mobile are made on the FCC, while control transmissions made from the mobile to the cell site are made on the RCC. When a mobile telephone is activated, the telephone scans all control channels and tunes to the strongest control channel which will typically correspond to the cell site nearest the mobile user.

When a user places a call from the mobile telephone, the telephone tunes to the strongest control channel thereby identifying a particular cell and its associated base station, and the transmission is made over the RCC. The control channel and voice channels associated with a cell may be defined as "local channels." The base station at the cell site receives the transmission and sends the call to the MSC. The MSC selects a voice channel for the call and connects the call to the mobile through the PSTN. As the mobile telephone travels, the call is handed-off to a different cell site when the quality of the transmission drops below a predetermined threshold, which may occur when the mobile telephone is approaching a boundary between cells. The hand-off process is typically controlled by the MSC.

The frequency reuse approach is employed to increase the use of available spectrum while minimizing co-channel and adjacent channel interference between the cell sites. The frequency reuse factor is determined by calculating the typical propagation loss of a signal over a defined cell radius and insuring that any resulting channel interference will not result in a carrier-to-interference ratio (C/I) of less than 18 dB, under the current U.S. AMPS systems using analog frequency modulation (FM). Specific frequency assignments are determined by the characteristics of the cellular equipment (such as transceivers, filters and power combiners) and such equipment often require that frequencies within a cell be separated by as many as 21 channels. This effectively limits the capacity of the system by limiting the spectrum available for use.

The aforementioned limitations result in the allocation of a fixed frequency plan that is typically obtained from pre-derived tables. This plan results in inefficient use of the available spectrum in many instances. Channel assignments are controlled by the cellular system operator and are generally programmed into the MSC. Deployment of such a system requires that the fixed frequency plan be "fined tuned" (also referred to as "frequency reallocation"). Such fine tuning is necessary due to the inexact nature of rf propagation which in reality may vary from the predetermined calculations embodied in the fixed frequency plan. Discrepancies occur for a variety of reasons, such as weather conditions or the construction of new structures. The tuning process is time consuming and inefficient. Tuning is also required as channels are added to the cellular system or when new systems are deployed.

Prior art cellular systems have addressed the limitations of the fixed frequency plan by utilizing micro-cells. Generally, a micro-cell divides a cell site into smaller cells each serviced by a separate base station. Typically the same number of channels are assigned to each base station and thus the channels per unit area is increased. While this approach increases capacity, the number of hand-off operations is increased and interference constraints must still be considered. More importantly, this system is based upon the fixed frequency plan and again must be fine tuned.

The fixed frequency plan assumes that all assigned frequencies may be in use at a given time and that propagation characteristics are theoretical in nature. In practice however, the use of frequencies varies with time of day and day of week on a statistical basis, and many channels are available at various points in time. In addition, theoretical propagation models do not account well for structures, hills, and valleys, and many signals that are expected to propagate a set distance do not. Consequently, the spectrum is inefficiently utilized and many channels could be made available for calls, but are excluded from use in the fixed frequency plan. Prior art methods such as dynamic channel allocation and channel borrowing have been proposed and are used to help solve the problem; however, these methods require coordination and returning within the system by the system operator. Given an operators desire to increase capacity in a user dense area, there is no known method to quickly accomplish this time consuming, overall system level returning approach.

Moreover, cellular operators often need to deploy new or temporary systems to increase the coverage area or to serve high capacity needs. These capacity needs can occur during conventions, sporting events and the like, or to provide coverage in fringe areas near service boundaries and in areas of new construction. Furthermore, additional capacity and coverage is often required in areas that experience localized demand such as campus environments, airports and the like. To implement such systems, current cellular designs require not only the returning process described above, but the MSC hardware and software must first be reconfigured to accept such additions. In many cases, it is not efficient to trunk the voice traffic back to the existing MSC, nor is there time available to retune the system. In addition, proprietary interfaces between the switch and the cell site force operators to utilize equipment from the original vendor to meet these needs. There is no known method to add a small, self contained cellular system to an existing network without coordination of frequencies and interfaces to the main cellular system.

Another limitation with the current cellular system approach arises when emergency communications are required. For example, in cases of natural disasters, cellular communications are heavily relied upon by emergency response teams such as the Federal Emergency Management Agency (FEMA). In such a situation, additional capacity is quickly needed and in addition, emergency related agencies would like control of their specific frequency set. With current cellular systems this requires the deployment of small, temporary systems that are governed by the fixed frequency plan and are coordinated and controlled by the local carrier MSC. In summary, there is no known method for deploying an independent, underlay, self contained cellular system within a main cellular system that can operate on unused cellular channels without coordination or control by the local carrier or does not have the need for frequency returning.

OBJECTS AND SUMMARY OF THE INVENTION

Accordingly, it is an object of the present invention to provide an underlay cellular telephone system that is deployed within a main cellular telephone system but operates independent of the main system, and does not require fine tuning operations.

It is a further object of the present invention to provide a cellular underlay telephone system capable of determining which frequencies are under-utilized within the main cellular system, and then establishing communication over such under-utilized frequencies.

Another object of the present invention is to provide a cellular system with detection means suited to determining when a call on a selected frequency in use by the underlay system becomes in use by the main system.

A further object of the present invention is to optimize usage of the available frequencies by dynamic channel allocation techniques.

A related object of the present invention is to provide a cellular system with increased capacity by more efficient use of spectrum in selected geographic areas.

In summary, these and other objects are achieved by the invention disclosed herein comprising an underlay cellular telephone system disposed within a main cellular telephone system. The invention includes a system and method suitable to provide an independent cellular system which operates as an underlay system to an existing main cellular system and provides public or private cellular service without the need for system returning or frequency coordination with the main cellular system. The main cellular system includes a plurality of contiguous cells, each of said cells having a fixed set of frequencies (or "channels") and a main controller (also referred to as a "switch" or "MSC") operatively coupled to said cells for coordination and control of communication within the main cellular system. The underlay cellular system operates to determine which of the fixed set of frequencies are under-utilized and establishes communication over any number of the under-utilized frequencies without coordination and control by the main controller. The underlay cellular system monitors the continued availability of the under-utilized frequencies by detecting certain interference conditions, and updates the under-utilized frequencies.

In an exemplary embodiment of the invention, there is provided an underlay cellular system disposed within the main cellular system and which includes at least one receiver subsystem for scanning the fixed set of channels and measuring rf activity within each of said channels, a channel activity detection system for determining a set of under-utilized frequencies within the fixed set of frequencies assigned to the main cellular system and for monitoring whether any one of the under-utilized frequencies becomes in use by the main cellular system, and at least one base station transceiver operatively coupled to the receiver subsystem for receiving and transmitting signals on any one frequency within said set of under-utilized frequencies. Also provided is an underlay MSC operatively coupled to the base station transceivers for coordination of communications within the underlay cellular system. The underlay cellular system may be configured to include hand off means suitable for reassigning any one of the under-utilized frequencies if it becomes in use by the main system, to another frequency within the set of under-utilized frequencies without coordination by the main controller.

In an alternative embodiment, a dynamic channel allocation algorithm may be employed to perform frequency assignments within the underlay system that most efficiently utilizes the set of under-utilized frequencies.

The present invention also provides for a method of operating an underlay cellular telephone system disposed within the main cellular system, comprising the steps of determining a set of under-utilized frequencies within the fixed set of frequencies, processing communication signals on any one frequency within the set of under-utilized frequencies, detecting the continual availability of the set of under-utilized frequencies and updating the set of under-utilized frequencies. Additionally, the inventive method provides for reassigning communication signals on any one frequency within the set of under-utilized frequencies if any one of the frequencies is used by the main system, to another frequency within the set of under-utilized frequencies without coordination by the main controller.

BRIEF DESCRIPTION OF THE DRAWINGS

Additional objects and features of the invention will be more readily apparent from the following detailed description and the appended claims when taken in conjunction with the drawings, in which:

DETAILED DESCRIPTION OF THE INVENTION

A. Overview

The present invention is designed to be deployed as an addition to an existing cellular system (hereinafter referred to as the "main cellular system") as a means to increase capacity within such system, or as an underlay to the main cellular system, and the present invention is hereinafter referred to as the "underlay cellular system." In either case, the inventive underlay cellular system operates independent of the main cellular system. In accordance with the present invention the system provides cellular service to users while operating within the main cellular system but without intervention from the main system controller, without any type of frequency assignment by the main system, and without the need for returning. The inventive underlay cellular system determines its own frequency plan, which may be optimized for efficiency and interference reduction. In other words, the underlay cellular system "reuses" the cellular channels allocated to the main cellular system. Thus, the underlay cellular system must first identify those cellular channels suitable for reuse which are generally the "under-utilized" channels; and second, since the main cellular system may increase utilization of such channels, the underlay cellular system must continuously monitor the quality and availability of the under-utilized channels (also referred to as "underutilized frequencies" and "reusable channels"). More specifically, the underutilized channels are identified by means described in detail below, and then this set of underutilized channels is communicated to the underlay base station. The underlay base station processes communication signals over this set of underutilized channels. The underlay cellular system (and more specifically, the Channel Activity Detector as described below) monitors channel activity within the main cellular and underlay cellular systems to detect any collisions between the underlay and main cellular system. In an exemplary embodiment, collisions are detected by measuring interference due to adjacent or co-channel use and classifying interference as intolerable when the signal to noise ratio falls below a certain threshold value, or alternatively, when the signal strength falls within a certain interference interval. If a collision is detected, the underlay cellular system deletes the interfering channels from the set of reusable channels and adds new channels. Further, the underlay cellular system may be configured to drop or hand-off a call in the event of interference with the main cellular system.

B. Underlay Cellular System

Figure 1A:
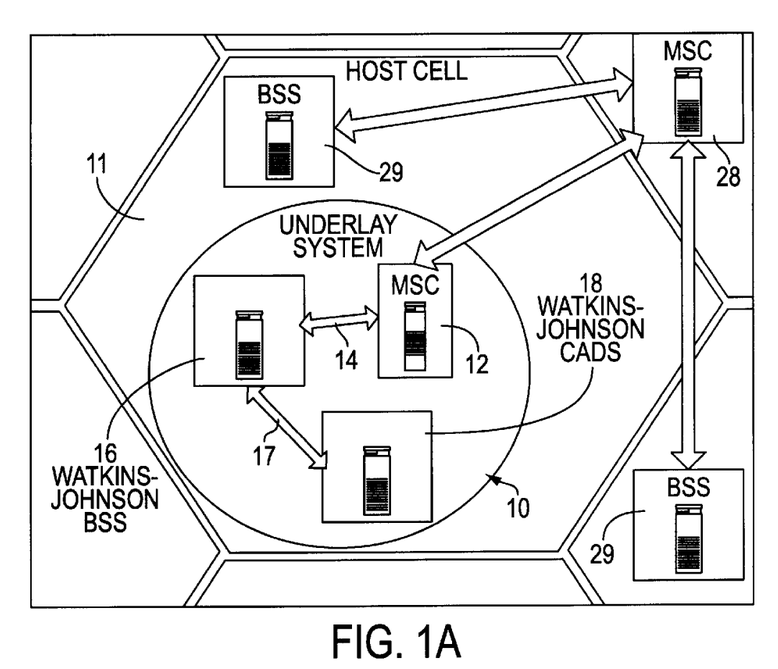
FIG. 1a illustrates the underlay cellular system of the present invention disposed within a conventional main cellular system.
Figure 1B:
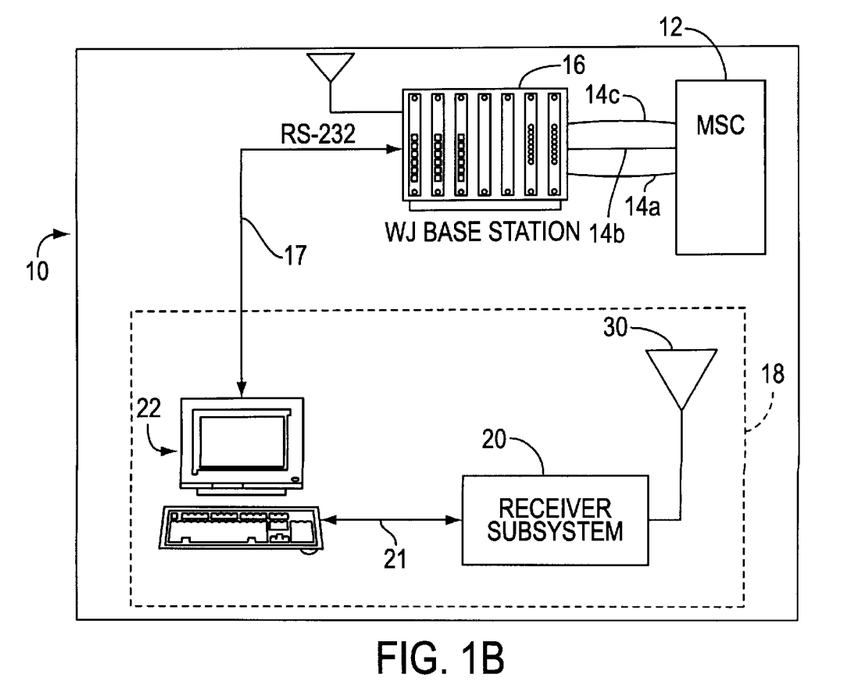
FIG. 1b is a block diagram representation of a single embodiment of the underlay cellular system in accordance with the present invention.
Figure 2:
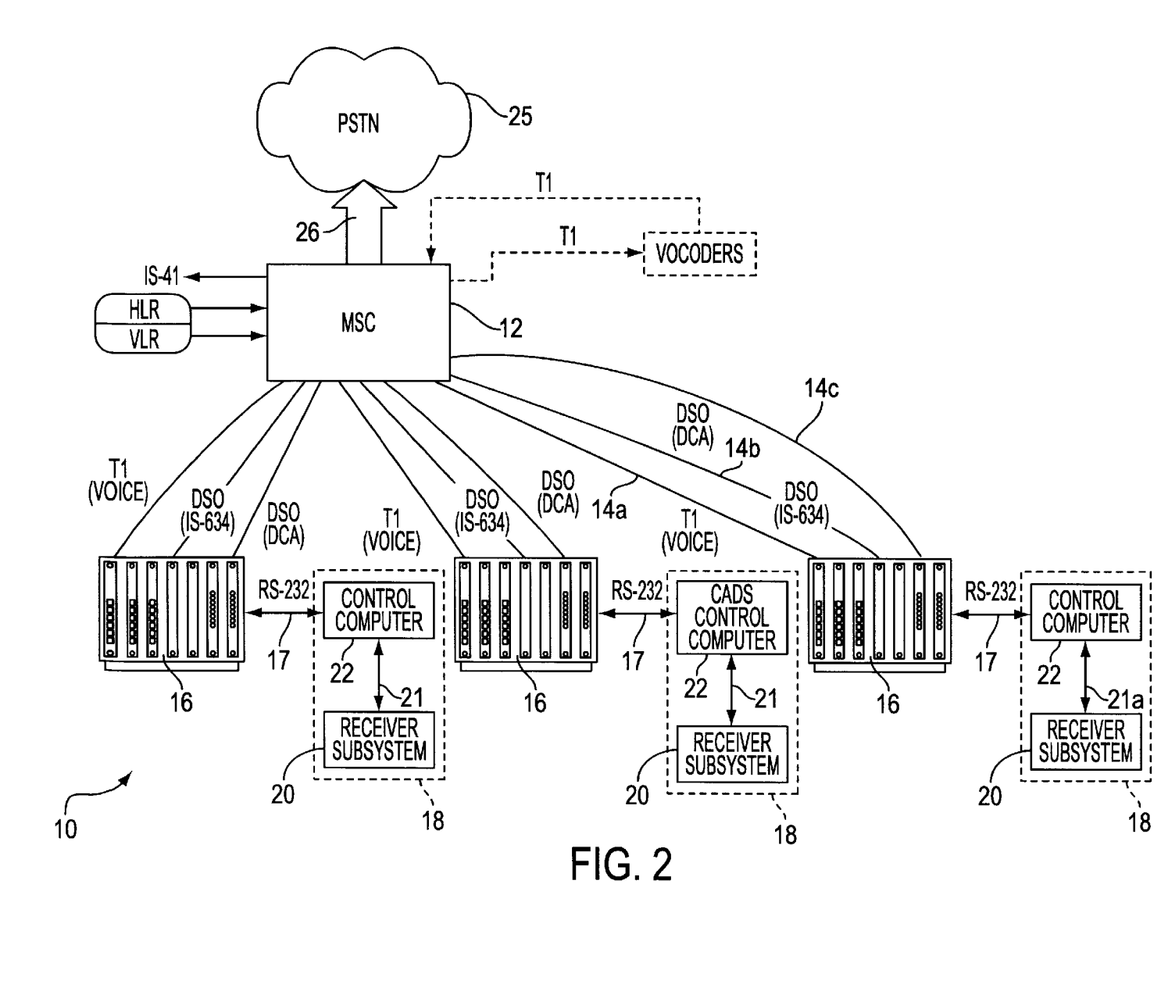
FIG. 2 is a block diagram representation of a distributed embodiment of the underlay cellular system in accordance with the present invention.
Figure 3:
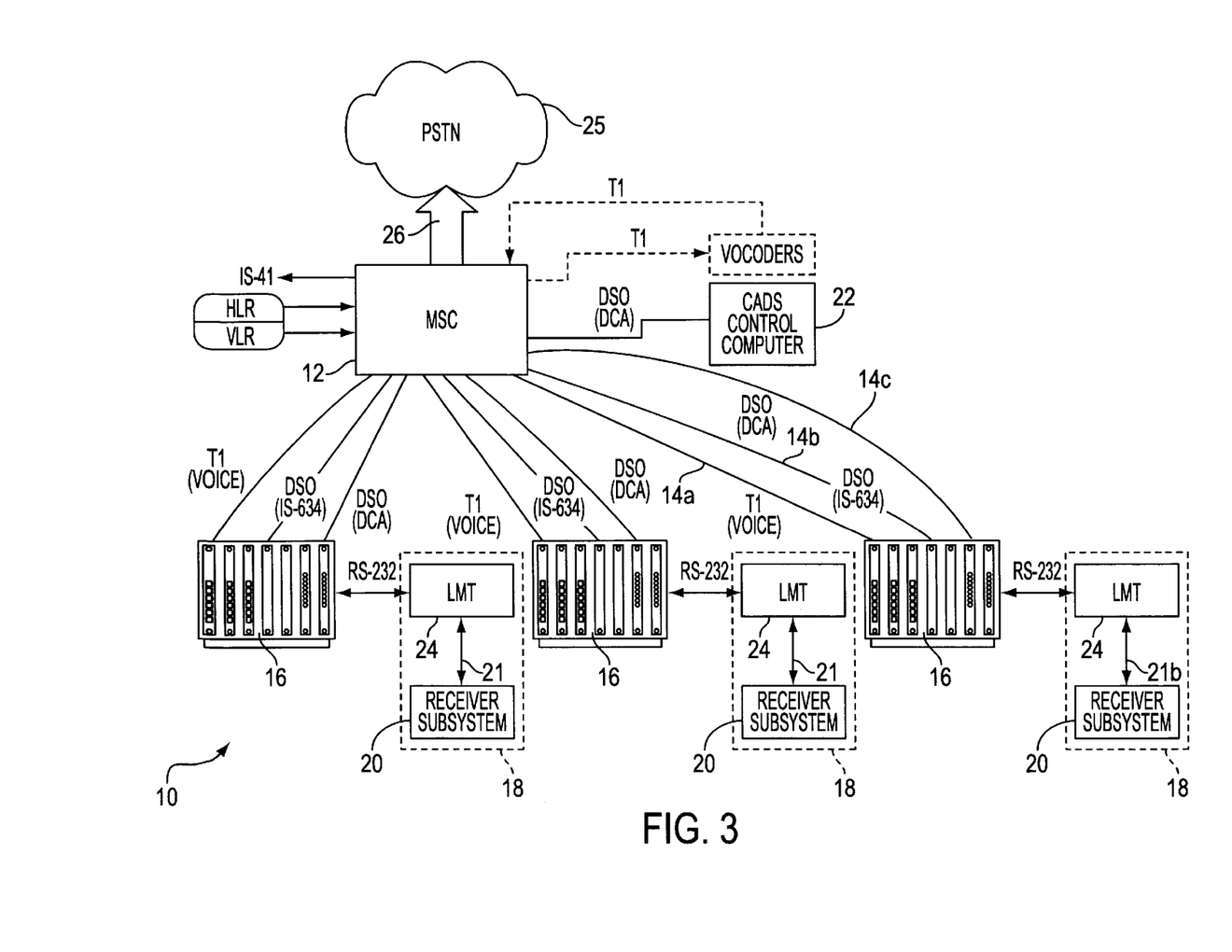
FIG. 3 is a block diagram representation of an alternative distributed embodiment of the underlay cellular system in accordance with the present invention.

Referring to FIGS. 1a and 1b, where like components are designated by like reference numerals in the FIG. s, one embodiment of the underlay cellular system is shown. The underlay cellular system 10 is disposed within the main cellular system, for example within a cell 11 of the main cellular system as shown in FIG. 1. Only one cell is shown for simplicity but it is understood that this configuration may be repeated within all or some of the cells of the main cellular system. A "single" embodiment of the invention is shown in FIG. 1b, that is where the underlay cellular system includes an underlay MSC 12 coupled via links 14a–14c to a one underlay base station transceiver 16. Coupled via RS-232 link 17 to the underlay base station transceiver 16 is a channel activity detector system 18 (CADS) for determining and monitoring the underutilized channels available for communication within the underlay cellular system. Alternatively, the invention provides for a "distributed" embodiment as shown in FIGS. 2 and 3, wherein the underlay system 10 includes an underlay MSC 12 coupled via links 14a–14c to a plurality of underlay base station transceivers 16; and coupled via RS-232 links 17 are a plurality of channel activity detector systems 18 (CADS).

In either embodiment, the underlay system may operate as a stand alone system, and receive incoming and outgoing calls independent from the main system. Alternativley, the underlay cellular system may interface to the main cellular system to receive incoming and outgoing calls, wherein the underlay switch 12 may be coupled to the PSTN 25 through an IS-41 signaling network 26. The PSTN 25 is coupled to the main cellular system MSC 28 for conventional operation of the main cellular system. Additionally, IS-41 allows MSC's belonging to different providers to pass information back and forth, and thus the underlay MSC 12 may be routed to communicate directly with the main cellular system MSC 28.

Referring again to FIGS. 1b, 2 and 3, the links 14a to 14c provide for different types of communication transfer between the underlay MSC 12 and the base station transceivers 16. In an exemplary embodiment, the invention is configured to the AMPS cellular standard and thus voice information is transmitted via conventional T1 links 14a, while signaling and control information is sent via conventional DSO links 14b configured to the IS-634 signaling format. A third DSO link 14c may be provided for transmission of dynamic channel allocation information. It will be understood to those of ordinary skill in the art, that the present invention may be configured to other cellular standards, such as TDMA.

The CADS generally includes at least one receiver subsystem 20 with an associated antenna 30, and a CADS control computer 22, coupled via an IEEE-488 bus 21. In an alternative embodiment of the "distributed" system (shown in FIG. 3), the CADS control computer 22 is coupled directly to the underlay MSC 12, and local control at the receiver subsystems 20 is provided by local maintenance terminals (LMT). Preferably, the LMT comprises a PC compatible computer and a Windows 3.1 compatible software applications program and is coupled to the receiver subsystem 20 via links 21 using conventional 9600 baud modems (not shown) operating over a dedicated phone line. In either of the distributed embodiments the logical control provided by the CADS is the same. For example, when the receiver subsystem 20 is locally controlled at each LMT, the overall tasking is directed from the CADS control computer 22, such commands being routed through the base station 16. The CADS control computer 22 generally includes a control processor which preferably utilizes a VME chassis with a plug-in UNIX-based processor. In an alternative embodiment the CADS and LMT are both implemented on the same computer processor using Windows 3.1 and the CADS appears as a button on the main LMT screen. The CADS control computer 22 is further configured (described in detail below) to identify those under-utilized cellular channels that are suitable for reuse by the underlay cellular system, and to continuously monitor the quality and availability of the reusable channels, and to update the channels for reuse.

The underlay MSC 12 receives instruction from the CADS control computer 22 for coordination and control of communications within the underlay cellular system independent from the main system MSC 28. That is, the underlay MSC 12 is not bound by the fixed frequency plan, as is the main cellular system MSC 28.

Figure 4:
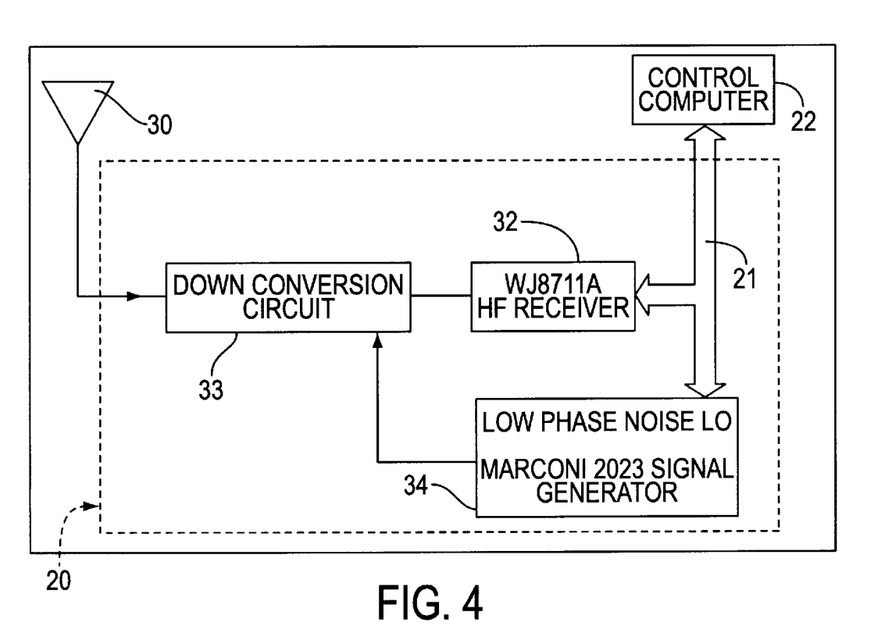
FIG. 4 is an exemplary schematic diagram of the receiver subsystem of FIGS. 1b, 2 and 3.

Of particular advantage, the system and method of the present invention provide for the determination of frequencies (or channels) available within the main cellular system for "reuse" by the underlay cellular system through rf means using the receiver subsystem 20 to monitor information being transmitted within the main cellular system. The receiver subsystem 20 scans all cellular channels within the main cellular system for rf activity, and are disposed within various cells of the main cellular system at any desired location, such as locations with suitable environments for receiving rf signals. Referring to FIG. 4 an exemplary embodiment of the receiver subsystem 20 is illustrated in further detail. Receiver subsystem 20 generally includes at least one antenna 30, at least one receiver 32, and a downconversion circuit 33 as known in the art. The CADS control computer 22 provides control of the receiver subsystem 20, and specifically controls the receiver 32 and the LO 34 over the IEEE-488 bus 21. Both the receiver 32 and the LO 34 are commanded and respond through this interface.

The receiver subsystem scans the cellular channels to collect the signal strength of rf activity on all cellular channels in the main cellular and underlay cellular systems. As the receiver subsystem 20 scans a channels it measures the signal strength of the channel and reports this information to the CADS control computer 22. Accurate measurement of signal strength is necessary to determine that a channel is sufficiently free of interference for reuse by the underlay cellular system. The rf environment in which the receiver operates has a primary effect on accuracy, and the location of the receiver subsystem determines the rf environment. Since the receiver subsystem 20 will receive transmissions made over the forward voice channel, and the base station transceiver 16 transmits over the forward voice channel as well, it is preferred to remotely locate the receiver 32 from the base station 16 to minimize an overload condition in the receiver 34 when forward voice channels are being scanned. However, the invention provides for the placement of the receiver subsystem 20 co-located with the underlay 16 or main system 29 base stations, and in such an instance it is preferred that the receiver subsystem 20 provide accurate signal strength measurements over a wide dynamic range. The rf levels seen by the receiver subsystem antennas 30 could be as high as 0 dBm. At these levels the number of under-utilized channels observed by the receiver subsystem may be limited by masking out their detection due to third order intermodulation and reciprocal mix. In the preferred embodiment, the receiver subsystem 20 employs a high dynamic range receiver 32, such as a WJ8711 HF receiver, known in the art, having an IP3 of +30 dBm and a phase noise of −135 dBc/Hz at 100 Khz offset.

In the exemplary embodiment, to convert the cellular band to the tuning range of the receiver, the receiver 32 is preceded by a low noise, high dynamic range downconverter in the downconversion circuit 33. Signal information in the cellular band is collected by the receiver subsystem antenna 30 which is connected to the rf downconverter 33. The rf downconverter 33 converts the cellular band frequencies to the region in which the receiver operates, and provides filtering, amplification, and attenuation of the input signals. A signal generator known in the art, such as a Marconi 2023, may be used to provide the downconversion LO 34.

The receiver subsystem 20 converts 800 to 1000 MHz cellular band to 6 to 29 Mhz, the tuning range of the receiver 32. As will be understood by those of ordinary skill in the art, many other designs may be used, and this example is provided for illustration only.

Preferably, the antenna 30 is suitable for receiving signals transmitted on the forward and reverse voice channels transmitted within the main cellular system. The antenna 30 may be configured for any suitable coverage area, and is not limited by the geographical location of a specific cell site within the main cellular system. Additionally, extended coverage may be desired as that provided by an omni directional antenna.

To process communication signals within the underlay cellular system, at least one underlay base station transceiver 16 is provided. One embodiment of a base station transceiver 16 that may be used in the present invention is a wideband digital base station as described in U.S. patent application Ser. No. 08/504,175, which is herein incorporated by reference. Alternatively, the invention may be practiced with any type of base station known in the art, such as a narrowband base station or analog based transceivers, provided however that such base station is configured to operate anywhere within the A or B frequency band and is not limited to only a fixed set (or range) of frequencies.

C. Operation of the Cellular Underlay cellular system

1. Overview

According to the present invention, the underlay cellular system does not operate on an allocated or fixed set of frequencies or channels. Instead, the underlay cellular system "reuses" certain of the cellular channels allocated to the main cellular system. Thus, the underlay cellular system must first identify those cellular channels suitable for reuse, and second, the underlay cellular system must continuously monitor the quality and availability of the reusable channels.

Of particular advantage, the present invention employs the channel activity detection system 18 (CADS) for the following functions: (1) determining an initial set of under-utilized frequencies within the main cellular system, (2) allocating frequencies for communication to the base station transceivers, (3) performing collision detection, and (4) updating the list of available frequencies in response to collision detection.

The underlay cellular system also includes hand off means suitable for reassigning any one of the under-utilized frequencies if it becomes in use by the main system, to another frequency within the set of under-utilized frequencies without coordination by the main controller. For example, the following non-standard hand-off method may be employed: A phone call is commenced on a channel that was deemed reusable by CADS. In monitoring the information content of control channels, CADS is able to detect the main cellular system attempting to access the channel in use by the underlay cellular system. The CADS then initiates a non-standard hand-off by generating a sequence of messages that mimics a standard hand-off procedure. In the single embodiment of the underlay cellular system (as shown in FIG. 1b) the handoff would be considered an inter-system handoff.

2. Determining the Available Frequency Set

The invention provides for a variety of ways to determine the available frequency set (also referred to as the set of underutilized channels), with each approach differing in complexity of the equipment employed and cost. When a mobile phone places or receives a call in the current AMPS and DAMPS systems, initial voice channel assignment information is sent out on the forward path (tower transmit) control channel which the mobile receives, demodulates and subsequently uses the information to tune itself to the assigned voice channel. There are 21 of these control channels that are constantly monitored and demodulated by the receiver 32 in the underlay cellular system under this approach. Moreover, when a mobile moves to a new cell and thus is assigned a new frequency channel, this process occurs using information sent on the currently assigned forward voice channel. Therefore, in order to insure that all assignments are known at any given time, the underlay cellular system monitors all forward control and voice channels in use at any given time.

Alternatively, a second simplified method can be used to determine the available frequency set. This embodiment makes the assumption that if a channel is occupied, it must be in use. Occupation can be determined by sensing (sniffing) energy within the channel, or in other words, by assigning the receiver 32 to a channel and monitoring the received signal strength (RSSI) of that channel.

The preferred approach is to monitor the RSSI for a given channel within the main cellular system. Since cellular traffic is full duplex in nature, when a forward voice channel is active, its reverse voice counterpart (45 MHz removed form the forward signal) will also be active and contain energy. In addition, reciprocity in forward and reverse path propagation is often assumed in cellular system design, thus leading to the conclusion that only one of the transmission paths—forward or reverse—would need to be monitored in order to determine occupancy. However, two considerations must be made under this approach. First, a cellular system is designed to constrain interference to a minimum and thus transmits the lowest power required for good call quality. These dynamic power reduction techniques are always used on the reverse voice channels, but rarely on the forward voice channel. In addition, typical system designs result in a link power imbalance between the forward and reverse paths that often favors the forward path by 6 to 10 dB. In summary, the probability of accurately determining occupancy is highest when monitoring the forward voice path transmissions. Secondly, real world propagation effects can invalidate the reciprocity assumption at any given point in time. This leads to additional, albeit small, probability of error in determining channel assignment if both paths are not monitored. Therefore, the preferred approach is to monitor the RSSI on both forward and reverse voice channels in order to determine channel occupancy for determination of the available frequency set.

According to the present invention, an initial set of available frequencies is obtained by a using a statistical approach. Given the fixed nature of the main cellular system frequency assignments, and the fairly predictable usage patterns that vary with the time of day and day of week; the probability of instantaneous occupancy on a channel within the main cellular system can be derived by scanning the forward and reverse cellular frequency bands over a set period of time. This method is used to determine the initial set of under-utilized channels within the main cellular system which may then be "reused" by the underlay cellular system. Preferably, this set will be programmed into the underlay base station 16 for start up of operation of the underlay cellular system. The initial scan produces a channel list for use by the underlay which makes collision with the main system unlikely, however since the underlay operates independent of the main cellular system it is possible for the main system to begin transmission over one of the channels in use by the underlay system. Accordingly, the inventive underlay system provides for the continuous detection of collisions and updates the frequency set in use by the underlay system to remove channels where any collisions have occurred.

Thus, as stated above, it can be summarized that the system and method of the present invention provides an underlay cellular system by identifying those cellular channels suitable for use within the main cellular system, assigns the suitable frequencies to the underlay base station, continuously monitors the quality and availability of the reusable channels to detect any collisions with the main system, and modifies the list of frequencies assigned to the underlay base station should interference with the main system occur. To implement this functionality, the CADS control computer 22 is configured to perform the following tasks, among others:

identify under-utilized cellular channels to be "reused" by the base station transceiver using a statistical approach. This function, an initial scan, is preferably performed before the base station is operational.

continuously detect and correct frequency collisions during normal underlay base station operations. This functions as a background scan.

load the frequency plan into the base station, and provide updates to the frequency plan to remove frequencies where collision is likely and to provide alternate frequencies available for use by the underlay cellular system's base stations.

(a) Signal Strength Measurement

In particular, the receiver subsystem 20 monitors channel activity, and the CADS control computer 22 receives and records the RSSI for both the forward and reverse voice channels for a desired period of time, preferably for a period of 15 to 72 hours (i.e. the initial scan). The CADS control computer 22 utilizes this information for determination of the initial available frequency set as discussed in detail below. During operation of the underlay cellular system, the receiver subsystem 20 continues to scan all channels to assist in providing collision detection (i.e. the background scan). Referring again to FIG. 4, in both instances of the initial scans and the background scans, the receiver 32 is sent a command from the CADS control computer 22, directing the receiver 32 to tune to a particular channel number, and then a command is sent to read the RSSI of that channel. Preferably, the initial scan is performed before the underlay cellular system begins operation. All Forward Voice Channels (FVC) and a selected subset of Reverse Voice Channels (RVC) of either the A or B cellular band are scanned by the receiver subsystem 20. In an exemplary embodiment, the receiver 32 performs the scanning function at a rate of one channel every 150 ms, which includes 40 ms to tune to the appropriate channel, 10 ms of control command overhead and 100 ms to read the RSSI and obtain an average value. It is preferred that the scanning function be performed as fast as allowed by the receiver.

To provide the inventive underlay cellular system with its own frequency assignment plan (i.e. self tuning) the initial scan is preformed and in the preferred embodiment the CADS computer 22 employs a statistical method to score and qualify certain of the set of fixed channels for inclusion on two lists, namely the Reusable Channel List (RCL) and the Assigned Frequency List (AFL) which are then used by the underlay base station transceiver 16 for communication.

This statistical method employs a basic assumption. That is, that the main cellular system is considered to be structurally time-invariant, i.e. the cell layout, the frequency allocation scheme, and the transmitted power of all FVC channels do not significantly change over time, or if they do change, they change very slowly.

To determine the channels that will comprise the RCL, the following methods are used. The rf activity is measured by the receiver 34 in the receiver subsystem 20 that is sequentially tuned by command from the CADS control computer 22 to the desired frequencies. The receiver 34 measures the signal strength present at each FVC channel for a short duration of time and then moves on to the next channel. This procedure is followed for the selected RVC's and the 21 dedicated control channels. The signal strength values collected over time form time series sets of data that are discrete and random with a reasonable distribution.

(b) Scoring a Channel for Reuse

The reusability of a voice channel for the underlay cellular system is assessed according to the history of its rf activity. In the preferred embodiment, the assessment process centers on selecting a filter (a threshold value) which is used to divide the measurements of possible signal strength values into tolerable and intolerable regions and "scores" the channels based on this criteria. This method serves to build in propagation effects into the selection of reusable channels by setting a threshold filter, and then using the filter to define the occurrence of a statistical event. In an alternative embodiment, no scoring may be used, and instead certain criteria are used to determine the reusability of a channel. For example, one may order the channels based on the average received signal strength, or one may identify the local channels and first order neighbors based on signal strength and not select channels belonging to these two sets.

The terms "tolerable" or "intolerable" refer to accepted interference levels relative to the filter value. Once this filter is selected, each FVC is scored in accordance with the total number of times the observation belongs to the tolerable relative to the intolerable region. The filter value can be estimated, by extrapolating (from the observed signal strength measurements) the desired interference level to the boundary of the underlay cell. This approach, however, requires a priori knowledge of the main systems's configuration parameters and cellular layout. The underlay cellular system is required to be able to operate without such knowledge. An alternative approach, and the preferred approach, is to use the system's history of rf activity and select a filter based on the assumption that the underlay cellular system's operation is primarily interference limited rather than noise limited.

Figure 5:
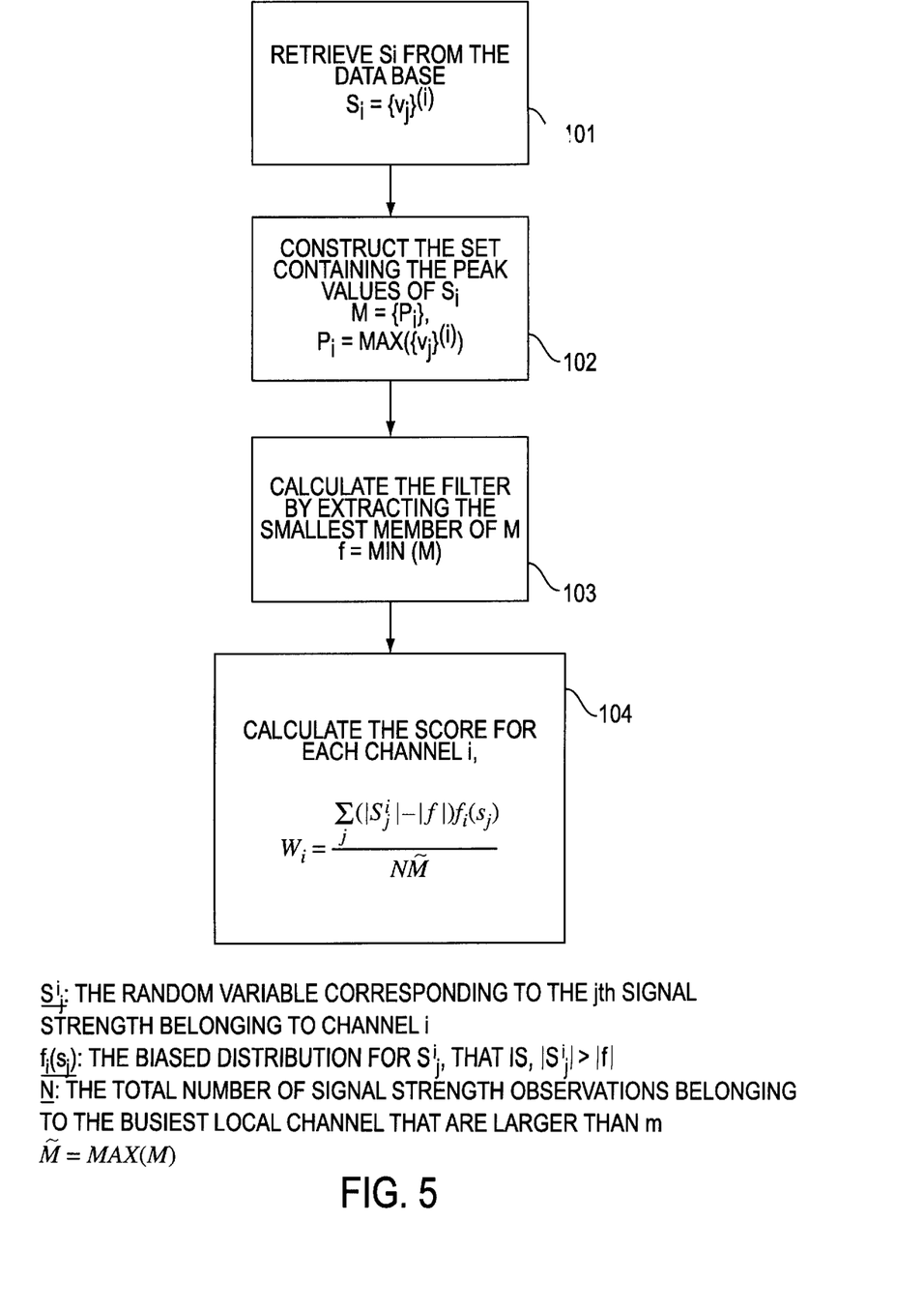
FIG. 5 is a flowchart depicting the filter determination and scoring methods performed by the Channel Activity Detector.

Turning to FIG. 5, a flowchart is presented which illustrates the filter and scoring methods performed by the inventive underlay cellular system. As shown at 101, to estimate the value of the filter, the signal strength values are observed over a period of time T at a rate of δ channels per second. $S_i$ is the set of signal strength values observed over T. The subscript i is the channel index, thus $S_1$ is the set of signal strength values observed when monitoring channel 1. It is assumed that T and δ are reasonable and ideally represented by:

t>>(number of channels)/δ and t<<T, where t is the average call duration. Then:

$$S_i = \{v_j\}^{(i)} = \{v_1, v_2, v_3, \ldots v_n\}^{(i)}$$

is the set of signal strength values observed during T for channel i, where the subscript j is the $j^{th}$ (a temporal index) signal strength observed for cellular channel i. $S_i$ is a bounded set, where its maximum and minimum are limited to the dynamic range of the subsystem receiver. It is further assumed that the distribution function for $v_j$ is well behaved. Next, at 102, a set of peak values of $S_i$ for all channels is constructed. M is the set containing the peak values of all channels, observed during time T. That is:

$$M = \text{Max}(S_i) = \{P_1, P_2, P_3, \ldots, P_l\}$$

where the subscript i indicates the highest channel number. At 103 the filter value is calculated, and a conservative lower bound on the interference level, the filter f, is given by the smallest element of M, where f is the filter value, f=Min(M). The average signal strength of a channel, $A_m$, is also a good measure of interference. However, note that $A_m<f$, and if $A_m$ were selected in place of the filter value f, the methodology, in the process of scoring, would penalize channels more for activity rather than the level of interference their use introduces into the system. Thus, the preferred method is to choose the filter value f as the filter against which each channel is scored for reuse.

The validity of this choice, or any other, depends on how closely the value f compares to the 18 dB C/I requirements. The filter value f, demarcates the tolerable regions from the intolerable interference regions and allows for a scoring of channel reusability based on the number of times the observed signal strength value of a FVC visits the intolerable region compared to the total number of samples, N, taken over the entire observation period T. At 104 the reusability score Wi of a channel is given by:

$$W_i = \sum_j (S^i_j - f) f_i(s_j) / N\tilde{M}$$

where $S^i_j$ is the random variable corresponding to the jth signal strength belonging to channel i; $f_i(s_j)$ is the biased distribution for $S^i_j$, that is $|S^i_j| > |f|$; N is the total number of signal strength observations belonging to the busiest local channel that are larger than M; and M=MAX(N). $W_i$ ranks a FVC based on two items, crossing a threshold, the filter, as well as the extent to which the RSSI crosses the threshold. That is, two channels with the same number of filter crossings are not ranked the same, the one that crosses the filter by a larger amount is ranked lower. Since the variations in signal strength at a fixed location can be represented with well behaved distributions, it can be shown that $W_i$ remains stable against small perturbations in the filter value. Assuming that f is a valid number, in that it reflects the lower bound on interference at the outer edges of the underlay cell, a question arises as to how meaningful is $W_i$ and how stable is $W_i$ with respect to small fluctuations in the value of the filter f. Since the variations in signal strength at a fixed location obey a well behaved distribution, $W_i$ is stable with respect to small fluctuations in filter value.

Thus, in summary, to determine which channels are suited for reuse by the underlay cellular system, the following steps are implemented. The greatest lower bound of the set containing the peak signal strength is chosen as the filter for each cycle. Alternatively, the operator may specify a filter value, and the actual filter value used for scoring a channel is the value supplied by the operator. A cycle dependent score for each FVC channel is computed, and the RCL containing a plurality of the best FVC channels is prepared. Preferably, the best 60 channels are selected as the RCL. Next, a plurality of the top channels from the RCL are selected to form the AFL. Preferably, the top 12 channels from the RCL are selected and make up the AFL. Any other number of channels may be selected. Preferably, the channels forming AFL shall meet the following criteria: (i) does not include any local channels; (ii) does not include any two adjacent channels; and (iii) does not include any channels that are adjacent to the local channels. Additionally, it is preferred that the frequencies in use by the underlay base station will provide a 18 dB minimum, underlay cellular system to main cellular system carrier to interference signal ratio. Additionally, frequencies for use by the underlay base station will provide a 18 dB minimum, main cellular system to underlay cellular system carrier to interference signal ratio. In another embodiment of the invention, an additional criteria is applied to the channels forming the AFL, which is: (iv) channels with a loud reverse side are not included. This concept is described in detail later in the description.

(c) Identifying Local Channels—A Second Level of Differentiation

To identify which channels are local, and thus not a part of the AFL according to the preferred embodiment, the following method is employed. When CADS becomes active, the receiver 34 starts tuning to and measuring signal strength over the cellular telephone frequencies that belong to the A or B band. First, the 21 control channels are scanned a number of times. The strongest control channel is identified as the one serving the local (also called the "host") cell, and its signal strength is used to identify the local voice channels, forward and reverse. Once the signal strength measurements of the control channels are completed, the cellular channels are then scanned in accordance with the signal scan sequence. A signal scan means the completion of a visit of the collective frequency set. A signal scan occurs in this order: the signal strength for each of the 21 forward control channels is measured first and the strongest channel is noted as local. Next, the 395 FVCs are, one by one, tuned to and their signal strength is measured. Each channel with a signal strength 3 dB smaller than the local signal strength or up to 6 dB stronger than the local signal strength is tagged as local. The last set of frequencies that are visited are the reverse voice channels, which are also identified as local by the process just described.

In an alternative embodiment, the method just described for identification of the local channels includes an additional step. Due to random events, such as environmental changes and fluctuations in multipath, the signal strength measured over a forward control channel may exhibit fluctuations. To better cope with these random events in the process of identifying local channels, the statistics of the fluctuations are used to construct an interval of signal strength values instead of a signal number that can be identified with the local signal strength. Specifically, the variance of scanned signal levels for the 21 control channels is used to construct the local interval, i.e. a countable set of bins centered around the signal level belonging to the strongest control channel, and the measure of the set is determined by the magnitude of the largest variance in the collection 21 control frequencies. Once this interval is established, all those forward voice channels for which the maximum measured (scanned) signal strength level falls within the boundaries of the "local interval" are tagged as local.

(d) Determining the Loud Reverse Voice Channels

In the preferred embodiment, the channels forming the AFL meet an additional requirement, voice channels with a loud reverse side (i.e. the RVC) are not included. Thus, in sum, in the preferred embodiment the channels forming the AFL meet the following criteria: (i) does not include any local channels; (ii) does not include any two adjacent channels; (iii) does not includes any channels that are adjacent to the local channels; and (iv) does not include channels with a loud reverse side. According to the present invention, a loud RVC is a channel for which the FVC has an acceptable score, but the reverse side exhibits an RF activity level that is comparable to those established for local reverse channels. Of particular advantage, the system and method of the present invention scans a selected subset of RVC throughout any given cycle. The selected RVC are all those for which the FVC's signal strength exceeds that of the local signal strength threshold. Hence, all local channels as well as those belonging to the AFL are scanned continually in the course of any cycle. To process the data belonging to the local reverse voice channels, the following steps are implemented, called "Scoring Step A":

1. From the statistical data, the peak signal value for each channel is extracted;
2. The greatest lower bound of the set containing the peak values is identified;
3. Each RVC is ranked according to the number of instances its signal strength has exceeded the lower bound, and is then normalized to the number of observations; and
4. The set containing the ranking is ordered according to the magnitude of its members.

The ordered set (resulting from step 4 above in Scoring Step "A") containing the ranking of the reverse voice channels establishes a measure of local reverse voice channel activity level that is used in a secondary decision making process regarding the reusability of a cellular channel.

Now, to determine the "loud RVCs," the following steps are employed: the reverse of the FVC (i.e. the RVC) belonging to the RCL are scanned n times, where n may be any suitable integer such as 10. The RVCs just scanned are then ranked according to the method described in Scoring Step A, with one exception. The filter determination, steps (1) and (2), are not applied. Instead the same filter as determined in Scoring Step A, is used to rank the channels. Thus, the rank of each RVC is compared to the ordered set that ranks the local RVCs (step 4 in Scoring Step A) and the result reflected in RCL. If the ranking of a non-local RVC is smaller than the smallest member of the ordered set, it is assigned a loudness of 0, and if it is equal to the largest member of the ordered set, it is assigned a loudness of 1.

Now, the AFL is constructed using one or more of the above criteria. In summary, four levels of discrimination may be applied to the RCL to select the top channels for inclusion in the AFL, they are: (1) two adjacent channels are not assigned to the AFL; (2) local channels are not assigned to the AFL; (3) channels adjacent local channels are not assigned; and (4) channels with loud reverse side are not assigned to the AFL. Preferably, if the loudness value is greater than or equal to 0.8, the channel is considered loud, however, this condition does not apply to channels that are actively is use by the underlay cellular system.

Once the AFL is constructed, it is sent to the underlay base station transceiver 16 which establishes communication over the channels comprising the AFL and operates independent of the main cellular system. To allow the underlay cellular system to continue operation as an independent, stand alone, underlay cellular system, the invention provides an interference detection system. Thus, once operation of the underlay cellular system begins, the CADS switches to the background scan mode of operations.

3. Interference Detection and Updating the Frequency Plan

In the exemplary embodiment, the primary task of the background scan is to detect collisions between the underlay and the main cellular systems. According to the present invention, a collision is defined as the simultaneous use of a channel by the main system and the underlay cellular system which produces unacceptable interference levels. The initial scan produces the reusable frequency lists RCL and AFL which makes collisions unlikely, but collisions are not completely eliminated since the underlay and the main system are autonomous. During the background scan, the receiver subsystem 20 monitors all FVC channels in the cellular band, as well as the RVC channels allocated to the underlay base station for reuse.

Figure 6:
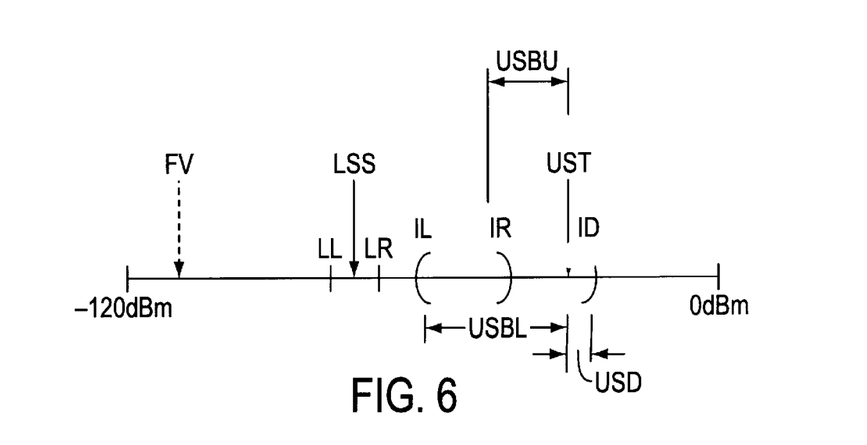
FIG. 6 is a depiction of the interference intervals in accordance with the present invention.

During the background scan, the CADS control computer 22 classifies the channel, based on its signal strength magnitude, in one of the following classes: (1) as belonging to the local cell (i.e. the cell of the main cellular system); (2) as belonging to the underlay cellular system; (3) as in the range of tolerable interference; and (4) as in the range of intolerable interference. To determine whether the channel is in the range of tolerable or intolerable interference in accordance with one embodiment of the present invention, the following method is employed. At the completion of each single scan, the signal strength measurements of the channels comprising the AFL are evaluated to determine if they fall within an interference interval. The intervals are best described with reference to FIG. 6 wherein the signal strength values, "S," in dBm are depicted along a horizontal line. Interference intervals are depicted by bracketed portions falling along the line, where:

FV=the threshold value, or the filter value
LSS=local signal strength
UST=underlay signal threshold
LL=lower bound of the local interval
LR=upper bound of the local interval
IL=lower bound of the left side interference interval
IR=upper bound of the left side interference interval
ID=lower bound of the right side interference interval
USBU=underlay signal band upper
USBL=underlay signal band lower
USD=underlay signal delta The interference intervals are defined by the bracketed regions spanned by all those values of S, such that:

$$IL \leq S \leq IR; OR$$

$$ID \leq S.$$

The position of these intervals along the horizontal line may be defined by the operator. Generally, the interference intervals may range from the FV to the IR. The interference condition is set when the measured signal strength of a forward voice channel that is contained in the AFL falls inside of an interference interval.

If the observed signal strength of a channel from the assigned frequency list falls into either classification (1) i.e. as belonging to the local cell or (4) i.e. as in the range of intolerable interference above, then it is assumed that interference has occurred with the main cellular system, and the channel is removed from the AFL. Another available channel from the RCL list is added in its place in the AFL. Preferably, such frequencies will be removed within 60 seconds following the onset of rf activity. If a call is in progress on this channel, the call is either handed off to an available channel or dropped. Specifically, this occurs in the following manner according to one embodiment of the present invention: A phone call is commenced on a channel that was deemed reusable by the underlay system (i.e. a channel from the AFL). The system monitors the information content of the control channels, and this allows the underlay system to detect when the main cellular system attempts to access the channel in use by the underlay system. The CADS then initiates a "non-standard" hand-off by generating a sequence of messages that mimics a "standard" hand-off procedure (i.e. that employed by the main cellular system).

In an alternative embodiment of the present invention, a different method for collision, or interference, detection may be employed. Specifically, the use of BER on blank and burst signals may be used. In AMPS and NAMPS cellular systems, the forward and reverse voice channels are often blanked for a short period of time (100 ms) in order to send system control data. This process is under the control of the base station and occurs whenever there is a need for frequency reassignment (hand-off) or reverse channel power control. The information sent is a digital signal that uses a FSK modulation format. It can be shown that the bit error rate (BER) of the received signal can be easily derived if the information being received is known (it will be a class of known responses). Therefore, one can assume interference if the BER of the received signal changes or is generally below some set threshold. Unfortunately, this process does not occur very often on a normal basis. It can however, be forced to occur by the base station as an "audit" function at the expense of a reduced grade of voice quality (100 ms drop-outs).

In another alternative embodiment of the present invention, the SAT color code and the absence of SINR may be used for collision, or interference, detection. In a cellular system, a supervisory audio tone (SAT) is continuously sent along with the forward voice signal and is transmitted back on the reverse voice signal. The SAT signal is a combination of up to three tones with frequencies that are above the standard 4 kHz audio voice signal and are filtered out of the resulting audio path after they are used for signaling purposes. Each transmit cell site is assigned a unique code and the SAT thus serves to let the mobile and system know which tower it is in communication with. Should the SAT be lost or the SAT color code (tone set) change, the underlay cellular system can assume interference (although the resulting false alarm rate may be high since SAT can be lost for a variety of reasons).

In yet another embodiment, the system is configured to demodulate as well as measure the RSSI. Monitoring the RSSI belonging to the control channels allows the classification of the control channels as either (a) local, (b) first order neighbors, or (c) second order neighbors. The FCC signals contain messages that direct the mobile unit to tune to a specific FVC. In this embodiment, the underlay system will scan and demodulate the control signals belonging to the local and first order neighbors, which will provide the underlay system with the information regarding which FVC is about to be used by the local or first order neighbor base station.

In yet another alternative embodiment of the invention constant modulus algorithms (CMA) techniques may be used for interference detection. Theoretically, an FM signal is constant in modulus (amplitude) by definition. Should co-channel interference with the signal occur, the amplitude of the desired FM signal will begin to vary. Detection of this amplitude variation can be used to detect interference. Unfortunately, multipath due to reflections of the desired signal can also occur thus causing a variation in amplitude of the FM signal. Multipath interference is coherent in nature since it is due to the same signal (out of phase); interference by a second signal is non-coherent in nature and may result in a different type of amplitude variation. Constant Modulus Algorithms (CMA) to detect these different type of amplitude variations may be programmed into the base station.

4. Processing Operations of the CADS Control Computer—Flowchart

The processing operations of the CADS control computer 22 are described in further detail with reference to the flow chart in FIG. 7. A number of terms are defined as follows:

(1) AFL—Assigned Frequency List, as stated above is an ordered list of the "best" voice channels. In one embodiment the AFL is comprised of the 12 "best" voice channels. The term "best" is in reference to the score obtained by each channel in the scoring method described above. The list contains the frequencies and their corresponding scores. A score of 0.0 simply means that the measured signal strength never exceeded the filter value. The ordering of the channels is based on average signal strength with the channel displaying the smallest average signal strength listed first.

(2) CDF—Condensed Data File, a data structure that contains the details of the signal strength measurements for each channel. The file contains the minimum, maximum, average, and a histogram recording of all scanned channels. The file includes all 365 forward voice channels, the 21 control channels, and a selected number of reverse voice channels, The histogram recording covers the range of –120 dBm to 0 dBm, in 2 dB bin resolutions.

(3) LSF—Local Statistic File, a file containing the local channel numbers, call duration statistics, and the number of calls statistics.

(4) RCL—Reusable Channel List, as stated above is an ordered list of the "best" 60 forward voice channels, where the word "best" refers to the score (also called the rating) as described above.

Generally, the operation of the inventive underlay cellular system begins with execution of Initial Operator Inputs process 110, where the operator enters a number of values and operating parameters (some may be optional and others mandatory) such as configuration parameters as well as responding to a number of questions. At the completion of this process all operator supplied inputs are written to a data base.

Valid Cycle decision making process 112 marks the beginning of the system's cyclical operation. The length of a cycle may be specified by the operator over a range from 1 to 24 hours. To determine the existence of a valid cycle, the CADS control computer 22 searches the data base for a cycle with a beginning that matches the current time of day and day of week. Once a valid cycle is found, the CADS control computer 22 proceeds to determine the CADS mode of operation. The preferred mode for an initial deployment is the Underlay Inactive Mode 114 in which CADS engages in the initial scan operation. Within the Underlay Inactive Mode 114, the Measure Signal Strength process 116 involves a number of functions performed by the CADS 18. The execution of these functions achieves the following goals:

an orderly tuning and taking of signal strength measurements of all of the forward control and voice cellular channels;

identifying the forward local (assigned to the local cell) control and voice channels;

identifying the reverse local voice channels tuning and taking of signal strength measurement of the reverse local voice channels; and creating a histogram recording of all the observed date.

The End of Cycle process 118 is a simple decision making routine that checks the validity of the current cycle. For a valid cycle, the process of signal measurement and recording continues. Once the current day of week, time of day coincides with the end of a cycle, the End of Cycle decision process 118 is executed and the Calculated RCL process 120 is executed.

The final output of the Calculate RCL process 120 is a list of 60 cellular voice channels, as described above. The list is ordered according to a reusability score. The list also includes information regarding the activity level of the reverse side of each channel as well as whether or not the channel belongs to the local cell. The score associated with each forward voice channel (included in RCL) is computed by a statistical measure (first order), as described in Section 2(b) above and in FIG. 5. The activity level of a reverse channel is measured by its loudness as described in Section 2(d) above. Loudness is determined by comparing the RF activity of a reverse voice channel to that of a local reverse voice channel. Due to the highly statistical nature of the reverse voice channel signals, the same algorithm used for scoring a forward voice channel cannot be used for scoring a reverse voice channel. Hence, Loudness is computed according to the following algorithm: First, the local reverse voice channels are ranked according to the following set of rules:

1. From the signal strength measurements of each local reverse voice channel, the peak signal strength is selected.

2. From the set containing the selected peak values, the smallest member is chosen, let this quantity by rev_filter.

3. The rank of a reverse voice channel is defined as $R_i = \eta_i/N$, where N is the total number of observations and $\eta_i$ is the number of signal strength measurements (of channel i) that exceed the rev_filter value. In other words, for each $|S_i| \geq |\text{Rev\_filter}| \eta_i$ is incremented by one.

All of the reverse voice channels that belong to the RCL are also ranked in a similar manner. We then define a Loudness scale for the local reverse voice channels as: the largest $R_i$ is assigned Loudness of 1, the second largest $R_i$ is assigned loudness of 1-1/C, and the third largest is assigned Loudness of 1-2/C, and so on. Here, C is the number of channels identified as local reverse voice channels.

Having completed such definitions, there is now a scale against which the reverse side of a channel, that is a candidate for reuse, can be measured and assigned a score, i.e. the Loudness.

After completing the calculation of the RCL, the CADS control computer 22 proceeds to construct the AFL. The Construct AFL process 122 selects a subset of the RCL frequency. As described above, the subset is selected by a filtering process that eliminates those frequencies that are deemed not reusable in accordance with the following rules:

1. Local frequencies are not allowed.

2. Adjacent frequencies are not allowed.

3. Adjacent to the local frequencies are not allowed.

4. Frequencies with their reverse channel Loudness exceeding a specific limit, set by the operator, are not allowed, and a fifth rule may be added where: 5. Frequencies with scores lower than what is indicated as acceptable by the operator are not allowed. That is if Wi<L, where L is the limit set by the operator, then channel i is not allowed (the operator should measure L by observing the activity level of local channels and their associated scores; these numbers are available in the CAD's data base). Thus, the output of the Construct AFL process 122 is a set of channels that are suitable for reuse by the underlay cellular system of the present invention.

Figure 7:
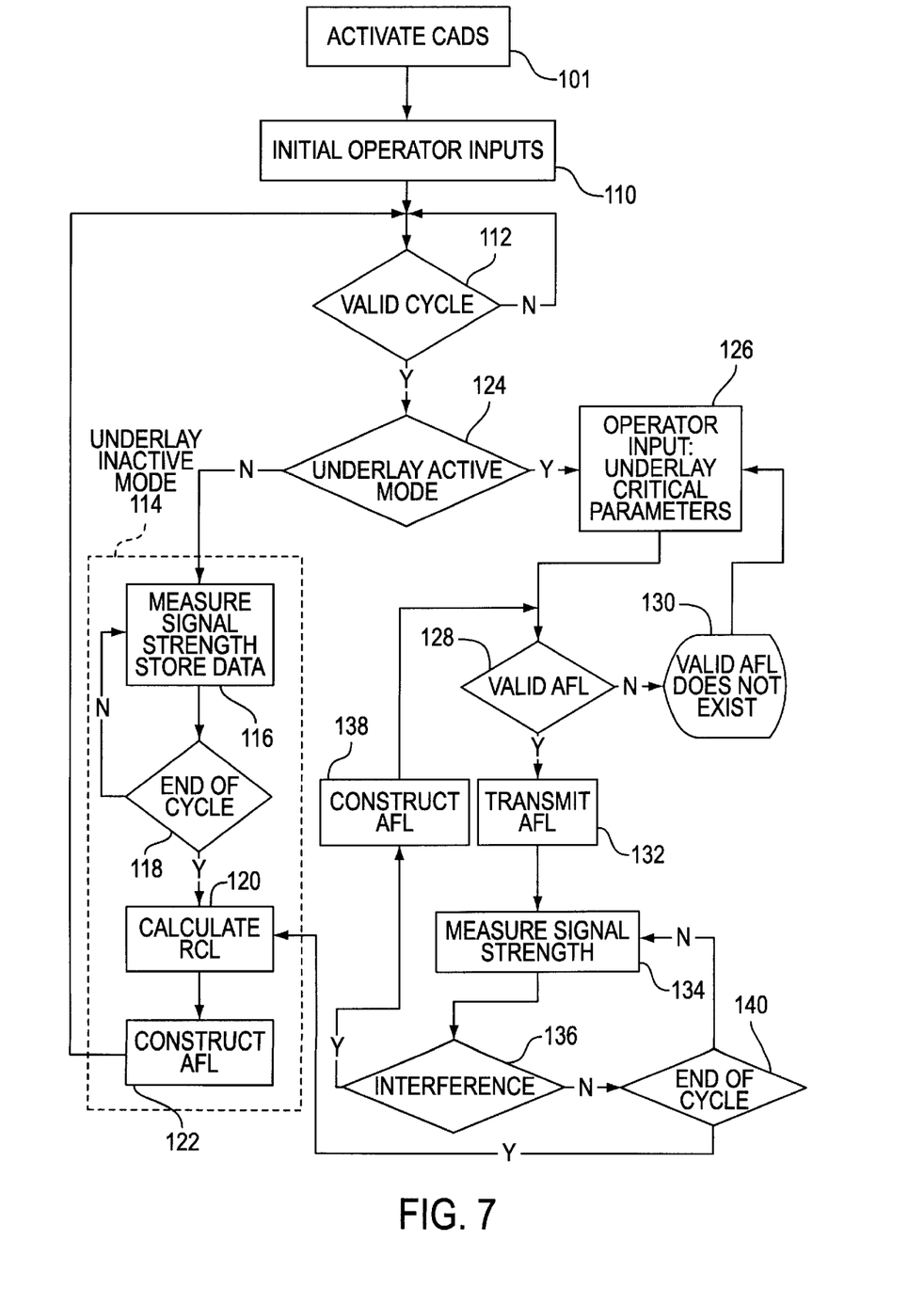
FIG. 7 is a flowchart illustrating the control and data flow in the Channel Activity Detector.

The underlay cellular system operates in one of two modes, the initial scan and the background scan, here shown in FIG. 7 as the Underlay Inactive Mode 114/Underlay Active Mode 124, respectively. The essential difference in the functional execution of these two modes is that during the initial scan Underlay Inactive Mode 114, the interference checking is excluded, and no AFL is transmitted to the base station. Referring again to FIG. 7, the CADS is brought up for operation at the Activate CADS step 101. At the Initial Operator Inputs step 110, the operator enters parameters that configure the dynamic channel selection and allocation algorithms as mentioned above. The operator will be typically be most familiar with the traffic patterns and demand profiles and will be best suited for setting the appropriate parameters. The system checks for a beginning of a cycle at the Valid Cycle step 112. A cycle is defined as the duration of time for which the CADS is scheduled to operate.

Of particular advantage, the CADS can be used in two different capacities. The CADS can be used as survey equipment by executing the Underlay Inactive Mode 114, or as an active frequency planner by executing the Underlay Active Mode 124. When used as survey equipment, the CADS collects data (i.e. the cellular channel activity), performs data analysis, and records the results (as valid AFL) for all cycles of operation. When the CADS operates in its active frequency planner role, the CADS not only performs survey tasks updating its data bases, it also actively assigns AFL to the base station. When the Underlay Active Mode 124 is true, CADS s an active frequency planner, that in addition to assigning frequency plans, checks for interference and repaired the frequency plans, checks for interference and repairs the frequency lists.

When the Underlay Active Mode 124 is true, the CADS checks for interference in addition to furnishing the frequency plan. To assist in accurately detecting the presence of interfering signals, the operator inputs certain parameters at Operator Input Underlay Critical Parameters step 126. Next, the AFL is enabled in the Valid AFL process 128. This decision making process step determines the existence of an AFL for a given cycle. Each AFL that is written to the data base contains a time and data tag that identifies its cycle. In order for the CADS to preform frequency planning for the underlay system, the CADS needs to have access to a valid AFL (i.e. one with the correct time/date tag). If a valid AFL is not found in the data base, the process is routed back to the Operator Input step 126 via step 130. Thus, the system notifies the operator and expects the operator to provide a valid AFL. Once a valid AFL is in place, the AFL is transmitted to the underlay base station in the Transmit AFL process 132. Now that the underlay cellular system is operating and establishing communications over the channels contained in the AFL, the cellular underlay system measures the signal strength at the Measure Signal Strength step 134. The process is the abstraction of the sequence of events that are executed to measure the activity of a cellular channel (radio frequency slot). In the Measure Signal Strength processes 116 and 134 the local control channels, LST, average local call duration, local number of calls per channel per unit time are measured, calculated and recorded for each cycle. The signal strength distribution, the maximum, the minimum, and the average signal strength are compiled and recorded for all FVC channels. An average signal strength value is compiled and recorded for each of the RVC channels that are scanned. And finally, the FVC channels that are found to be local channels are tagged as such. Next, the system performs interference detection. To perform interference detection, as described above in section 3, the underlay cellular system measures the signal strength of all FVC in the cellular band and the RVC allocated to the underlay base station for reuse in the Measure Signal Strength process 134.

Interference detection is performed in the Interference process 136. As described above, interference exists if an AFL assigned channel has a signal value that exceeds the established local signal threshold (LST) value. If interference is detected, the Interference process 136 is in the yes condition and the interfering channel is removed from the AFL. A new AFL is then constructed in the Construct AFL process 138, which includes all of the steps that are involved in constructing an AFL from a RCL. The new AFL is constructed by replacing the deleted channel with the next eligible channel from the RCL and the AFL is updated in the Valid AFL process 132. The new AFL is then communicated to the underlay base station transceiver via the Transmit AFL process 132. Note that interference detection is employed only when the Underlay Active Mode 124 is in effect. This process continues until the End of Cycle process 140 detects the conclusion of a cycle.

Thus, an inventive cellular underlay system has been described, where the underlay system operates independent of the main system, establishes communication over under-utilized frequencies and employs interference detection means to monitor the continued availability of the under-utilized frequencies. The forgoing description of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the Claims appended hereto and their equivalents.

We claim:

1. An underlay cellular system disposed within a main cellular system, said main cellular system having a plurality of contiguous cells, each of said cells having a fixed set of frequencies and a main controller operatively coupled to said cells for coordination and control of communication within said main cellular system, the underlay cellular system comprising:

a channel activity detection system having at least one receiver subsystem and a controller for determining a set of statistically determined under-utilized frequencies within said fixed set of frequencies, monitoring means for monitoring the continual availability of said set of under-utilized frequencies, for updating said set of under-utilized frequencies responsive to said monitoring means, and means for reassigning said signals if any one of the set of under-utilized frequencies becomes in use by the main cellular system to another frequency in said set of under-utilized frequencies; and at least one transceiver operatively coupled to said channel activity detection system for receiving and transmitting signals on any one frequency within said set of under-utilized frequencies, whereby the underlay cellular system operates without coordination and control of said main controller.

2. The underlay cellular system of claim 1 wherein said set of under-utilized frequencies comprises 60 channels.

3. The underlay cellular system of claim 1 wherein said set of under-utilized frequencies comprises 12 to 60 channels.

4. The underlay cellular system of claim 1 wherein said set of under-utilized frequencies comprises 12 channels.

5. The underlay cellular system of claim 1 having certain of said frequencies within said set of fixed frequencies designated as local channels, and wherein said set of under-utilized frequencies comprises a plurality of channels where none of the channels are adjacent channels and none of the channels are local channels.

6. The underlay cellular system of claim 1 wherein said at least one transceiver is a wideband digital transceiver.

7. The underlay cellular system of claim 1 wherein said at least one receiver subsystem further comprises:
- at least one antenna for receiving signals transmitted over said set of fixed frequencies;
- a downconversion circuit coupled to said antenna for downconverting the signals received by the antenna;
- a receiver coupled to said downconversion circuit for receiving the downconverted signals; and
- a local oscillator for tuning said receiver to a desired frequency.

8. In a cellular telephone system including a plurality of contiguous cells, each of said cells having a fixed set of frequencies and a controller operatively coupled to said cells for coordination and control of communication within said cellular telephone system; an underlay cellular telephone system disposed within said cellular telephone system, characterized in that said underlay cellular telephone system operates to determine which of said fixed set of frequencies are statistically determined under-utilized and establishes communication over any number of the under-utilized frequencies, and then continues to monitor said under-utilized frequencies to detect any interference between said under-utilized frequencies and said fixed set of frequencies without coordination and control by said controller.

9. A method of operating an underlay cellular telephone system disposed within a main cellular telephone system, said main system having a plurality of contiguous cells, each of said cells having a fixed set of channels and a main controller operatively coupled to said cells for coordination and control of communication within said main system, comprising the steps of:
- determining a set of statistically determined under-utilized channels within said fixed set of channels;
- processing communication on any one channel within said fixed set of channels;
- detecting the continual availability of said set of under-utilized channels by measuring interference between said set of under-utilized channels and said set of fixed channels;
- reassigning communication on said any one channel if said channel becomes in use by said main system, to another channel within said set of under-utilized channel; and
- updating said set of under-utilized channels responsive to said step of detecting, whereby the underlay cellular telephone system operates without coordination and control by said main controller.

10. The method of claim 9 wherein the step of determining a set of under-utilized channels further comprises:
- measuring the signal strength in each of said channels in said set of fixed channels over a period of time T, to obtain a plurality of RSSI measurements for each of said channels;
- establishing a first set of values containing the peak RSSI measurements of each of said channels;
- selecting a threshold value, said threshold value being the smallest RSSI measurement in said first set of values;
- ranking each of said channels, by the number of times its RSSI measurements exceed the threshold value over time T, to form a second set of channels; and
- selecting a plurality of channels from the top of said second set of channels to form said set of under-utilized channels.

11. The method of claim 9 wherein said set of under-utilized channels comprises 60 channels.

12. The method of claim 9 wherein said set of under-utilized channels comprises 12 to 60 channels.

13. The method of claim 9 wherein said set of under-utilized channels comprises 12 channels.

14. The method of claim 9 wherein certain of said channels within said set of fixed channels are designated as local channels, and wherein said set of under-utilized channels comprises a plurality of channels where none of the channels are adjacent channels and none of the channels are local channels.

15. The method of claim 9 wherein certain of said channels within said set of fixed channels are designated as local control channels, and wherein the step of detecting further comprises:
- measuring the signal strength of the local control channels and designating the signal strength of the local control channels as a local threshold;
- measuring the signal strength of each of said under-utilized channels on a periodic basis;
- comparing the signal strength of each of said under-utilized channels to said local threshold; and
- deleting any one of said under-utilized channels from said set of under-utilized channels when its signal strength exceeds the local threshold.

16. The method of claim 15 wherein said step of deleting any one of under-utilized channels from said set of under-utilized channels shall occur within 60 to 360 seconds from when its signal strength exceeds the local threshold.

17. The method of claim 10 wherein said period of time T is in the range of 1 to 24 hours.

18. The method of claim 10 wherein said period of time T is 8 hours.

19. An underlay cellular telephone system disposed within a main cellular telephone system, said main cellular system having a plurality of contiguous cells, each of said cells having a fixed set of channels and a main controller operatively coupled to said cells for coordination and control of communication within said main system, the underlay cellular system comprising:
- at least one receiver subsystem for scanning rf activity on said fixed set of channels and recording the received signal strength of each of said fixed set of channels;
- a channel activity detection system for receiving the received signal strength of each of said fixed set of channels and including selecting means to select certain channels within said fixed set of channels to form a set of statistically determined under-utilized channels;
- at least one transceiver operatively coupled to said channel activity detection system for receiving and transmitting signals on any one channel within said set of under-utilized channels,
- wherein said channel activity detection system further comprises monitoring means for detecting which any one of said under-utilized channels becomes in use by said main cellular system, and including updating means for updating said set of under-utilized channels responsive to said monitoring means; and
- hand off means for reassigning any one of said under-utilized channels if it becomes in use by the main system, to another channel within said set of under-utilized channels, whereby said underlay cellular system operates without coordination and control by said main controller.

20. The monitoring means of claim 19 where in said at least one receiver subsystem scans rf activity on said set of under-utilized channels and records the received signal strength on each of said under-utilized channels, and said controller compares the received signal strength to a threshold value.

21. The underlay cellular system of claim 19 wherein said set of under-utilized channels comprises 60 channels.

22. The underlay cellular system of claim 19 wherein said set of under-utilized channels comprises 12 to 60 channels.

23. The underlay cellular system of claim 19 wherein said set of under-utilized frequencies comprises 12 channels.

24. The underlay cellular system of claim 19 having certain of said channels within said set of fixed channels designated as local channels, and wherein said set of under-utilized channels comprises a plurality of channels where none of the channels are adjacent channels and none of the channels are local channels.

25. The underlay cellular system of claim 19 wherein said at least one transceiver is a wideband digital transceiver.

26. The underlay cellular system of claim 19 wherein said rf subsystem further comprises:
   at least one antenna for receiving signals transmitted over said set of fixed channels;
   a downconversion circuit coupled to said antenna for downconverting the signals received by the antenna;
   a receiver coupled to said downconversion circuit for receiving the downconverted signals; and
   a local oscillator for tuning said receiver to a desired channel.

27. The underlay cellular system of claim 19 wherein said at least one transceiver is a narrowband transceiver.

* * * * *